Oct. 16, 1956  G. L. PATRICK  2,767,006
TRUCK TRAILER OPEN DOOR LATCH
Filed Jan. 25, 1954
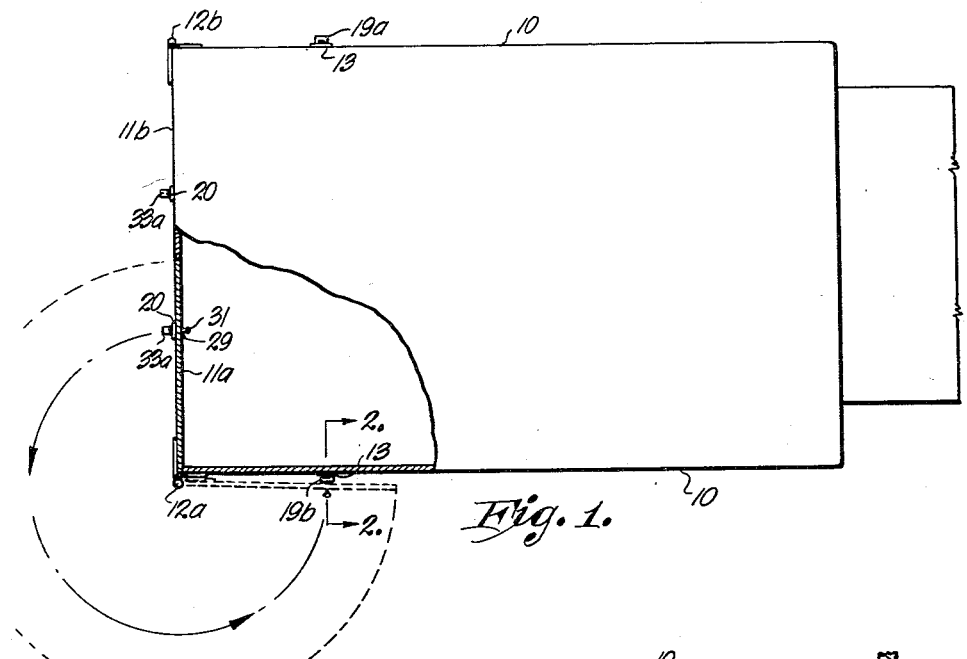
Fig. 1.
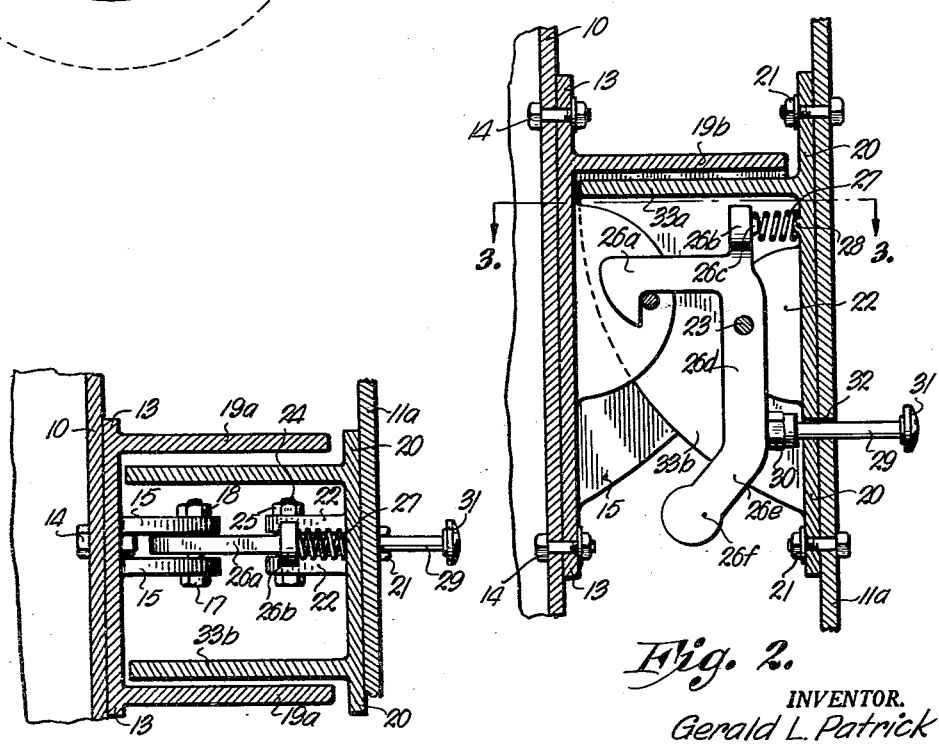
Fig. 2.
Fig. 3.
INVENTOR.
Gerald L. Patrick
BY
Thos. E. Scofield
ATTORNEY.

United States Patent Office 2,767,006
Patented Oct. 16, 1956

2,767,006

TRUCK TRAILER OPEN DOOR LATCH

Gerald L. Patrick, De Soto, Kans.

Application January 25, 1954, Serial No. 405,813

2 Claims. (Cl. 292—127)

This invention relates to heavy duty door latches and refers more particularly to a latch assembly designed to be employed on the rear doors of truck trailers to secure them in opened position.

The large cargo-carrying trailer truck has become a fixture on the nation's highways and is a common sight to every motorist. Numbers of these vehicles may be seen daily loading or unloading at any large manufacturing or distributing company. Efficient, safe and swift loading and unloading operations are thus of basic importance to any trucking firm and its customers.

The basic construction of the trailer truck is a cab driving unit to which may be attached a large capacity trailer. The trailer is loaded and unloaded at its rear end into which access is afforded by two large doors pivoted at the sides of the trailer and comprising in themselves the entire rear end of the trailer. These massive doors often weigh over one hundred pounds apiece and require strong heavy latches to fasten them in either closed or open position.

Latching truck trailer doors in closed position is a relatively simple proposition employing merely heavy duty latching means of conventional construction. Fastening the doors in the open position against the sides of the truck, however, brings a number of important factors into consideration which are not encountered in the previous case. For example, the trailer often may be parked to load or unload on an incline, thereby causing the weight of the doors to fall toward or away from the sides of the truck, which stress must be carried by the latching means. Furthermore, winds of greater or lesser velocity may act upon the open doors, creating sudden and severe stresses and strains from varying angles. Again, weather conditions of mud or ice may tend to clog or jam any exposed parts of latching mechanisms and open rear door latches are necessarily at least partly exposed. Additionally, it is obvious that such latches must be constructed so as to be readily accessible for repair as damage or breakage might occur away from convenient repair facilities. Finally, but not least, is the human aspect—such latches must be accessible to permit easy operation and must offer a minimum hazard to the operator. This last characteristic is of the utmost importance in view of the adverse weather, wind and lighting facilities often encountered in the operation of trailer trucks.

Current open trailer door latches include various types of receiving members mounted on the side of the truck adapted to receive and engage numerous types of extensions in the form of shafts or chains mounted on the trailer doors. These conventional latches suffer from lack of sureness in latching, weakness, inadequate weather shielding, lack of simplicity in repair and almost universally present a high degree of hazard to the operator's hands in fastening and unfastening. The latter is often due to the necessity of reaching behind the door to operate the latch sight unseen. The open door latches truly represent at the present time a backward portion of trailer truck technology in need of correction.

Therefore an object of the present invention is to provide an open door truck trailer latch assembly that is of simple, rugged, heavy duty construction, easy in operation, wherein the portion of the latch mounted on the rear door and the portion mounted on the side of the trailer are each shielded from the weather while remaining easily accessible for repair or replacement of parts.

A further object is to provide such a latch assembly which may be operated alternatively from either inside or outside the door in open position and in such a manner from either side as to offer virtually no hazard to the operator.

Another object is to provide such a latch assembly which is very secure and tenacious in holding due to action of its parts and its construction, thereby holding the heavy truck doors securely in open position despite trailer angle or wind or motion stresses.

Still another object is to provide such a latch assembly wherein the working parts of the latch are protected from jamming into themselves or their mountings by the action of other parts of the assembly.

Other and further objects will appear in the course of the following description.

In the drawings, which form a part of the instant specification and which are to be read in conjunction therewith, there is shown an embodiment of the invention, and in the representation thereof in the various views, like numerals are employed to refer to like parts:

Fig. 1 illustrates a plan view of a truck trailer with parts in section, showing one rear door in closed position in full lines and the same door in open position in dotted lines with the latching assembly embodying the invention mounted on the doors and sides of the trailer;

Fig. 2 is a side sectional view of the latch assembly in engaged position and is a view taken along the lines 2—2 of Fig. 1 in the direction of the arrows;

Fig. 3 is a plan view of the latch assembly taken along the lines 3—3 of Fig. 2 in the direction of the arrows.

Referring to the drawings and first to Fig. 1, the numeral 10 refers to a trailer having rear doors 11a and 11b. Doors 11a and 11b are pivoted at hinges 12a and 12b and open outwardly. Doors 11a and 11b move in an approximate 270° arc from the closed position to an open position roughly parallel to the sides of the truck. Conventional latching means (not shown) are employed to fasten the doors in the closed position and the latch assembly comprising the present invention is employed to secure the doors in the open position. This assembly comprises two portions, one of which is fastened to the side of the rear door facing outward when the door is closed and the other attached to the side of the trailer. Thus, when the door is in open position, the two portions of the latch assembly are opposed in engaging position.

In Figs. 2 and 3 is shown the latch assembly with its two portions in engaged relationship. Referring first to the latch-receiving portion of the assembly which is mounted on the side of the trailer, the numeral 13 designates a mounting plate, preferably of steel and a quarter of an inch thick, which is fastened to the side of the trailer by bolts 14 or other means. Welded or otherwise fastened to plate 13 are disk-shaped plates 15 with holes 16 in the edges thereof. Bolt 17 having nut 18 engages plates 15 through said holes. Weathershield 19 having side walls 19a and top 19b encloses plates 15 thereby protecting the latch-receiving portion from the sides and above. If desired, the entire latch-receiving portion may be recessed in the side of the trailer with the weathershield extending out of the side or not as desired. One of the sides 19a of the shield is positioned farther from plates 15 than the other thereby permitting removal of bolt 17 in case of damage or excess wear. The bolt removal side 19a of the shield must be positioned at least the length of the bolt from the adjacent plate. The other side of the shield is positioned a sufficient distance from its adjacent plate to permit convenient access to nut 18.

Referring to the latch portion of the latch assembly which is attached to the outer surface (closed position) of rear door 11a, the numeral 20 indicates a mounting plate preferably of steel and at least a quarter of an inch thick which is fastened to the door 11a by bolts 21 or other means. Welded or otherwise suitably fastened to plate 20 are disk-shaped plates 22 having holes 23 in the edges thereof. Bolt 24 having nut 25 engages plates 22 through said holes. Mounted on the shaft of bolt 24 is latch 26 having hook portion 26a, spring receiver 26b with stud 26c, shaft 26d and handle 26e having knob 26f at the end thereof. Spring 27 engages spring stud 28 on mounting plate 20 and spring receiver stud 26c on the latch 26. If desired, spring receiver 26b may be positioned farther along the latch 26 towards hook portion 26a. Latch disengaging bolt 29, having nut 30 seized or otherwise attached to one end and face 31 attached to the other, extends through mounting plate 20 and door 11a abutting latch shaft 26d. A sleeve (not shown) may be employed in passage 32 through the plate and door. The shaft of disengaging bolt 29 is made of sufficient length in excess of the thickness of mounting plate 20 and door 11a to lift the end of hook 26a above the shaft of bolt 17. Weathershield 33 having top 33a and sides 33b encloses the latch assembly and extends beyond all parts thereof except latch handle 26e. Shield 33 is so constructed as to mate inside shield 19 when the latch assembly is in engaged position thereby completely shielding the entire assembly from the sides and above. The sides 33b of shield 33 are positioned relative the plates 22 so as to permit removal of bolt 24 as well as access to nut 25. Bolts 24 and 17 are of equal length, thus allowing removal of both when the latch assembly is engaged, as well as access to nuts 25 and 18. When the latch assembly is engaged, shields 33 and 19 have less clearance from mounting plates 20 and 13 than the hook portion 26a of the latch has from mounting plate 13.

In operation, door 11a is opened and moved in an approximately 270 degree arc until the latch receiving and latch carrying portions of the latch assembly engage. To achieve full locking engagement, it is not necessary for the operator to reach in between the door and the side of the trailer, which feature eliminates one primary source of injured fingers. As the two portions approach, the curved front surface of the hook portion engages the shaft of bolt 17 thereby riding up thereover against the action of spring 27 and the weight of handle 26e. As the bottom edge of the hook 26a passes over the shaft, the hook 26a falls into place impelled by the spring 27 and the weight of handle 26e. It should be noted that nut 30 and hook portion 26a are of such width as to prevent the upper edge of hook 26a falling below the shaft of bolt 17 when the latch is at its limit of rotation around the shaft of bolt 24 so as to hinder the hook riding up over the shaft. Thus a simple, rugged safe latching action is provided.

It should be noted that weathershields 33 and 19 are so constructed, as previously noted, as to absorb any shocks of contact in motion of the door towards the trailer and the clearance between the shields and mounting plates 20 and 13 is made of a small order (approximately ¼ inch) so as to preclude any excessive motion of the door and trailer relative each other. Under some circumstances it may be desirable to omit weathershield 19 and rely entirely on corresponding shield 33 positioned on the door 11a. This is contemplated as an alternative. Shield 33 by itself will provide weather and shock protection to the latch assembly in engaged position.

To disengage the latch assembly, the operator merely presses on the face 31 of disengaging bolt 29. The force exerted thereon moves latch 26 in rotation around the shaft of bolt 24 thereby lifting hook 26a free of the shaft of bolt 17. Thus there is no need for the operator to ever reach between the door and the trailer at the hazard of his fingers. Should, however, the disengaging bolt 29 be damaged, or for some other reason the operator desires to disengage the latch another way, handle 26e extends down below shields 33 and 19 and may easily be moved to disengage hook 26a. Shields 33 and 19, by limiting the motion of door toward the wall of the trailer protect the hands of the operator even in this instance.

It is also contemplated that in some instances it may be undesirable to employ disengaging bolt 29. As described above, the provision of shields 33 and 19 and handle portion 26e on latch 26 permit safe operation of the latch in such case. In this instance a protuberance (not shown) may be provided on the rear of latch shaft 26d between shaft 26d and mounting plate 20 to compensate for the missing bolt 29 and nut 30 in preventing excessive drop of hook portion 26a when in disengaged position.

Thus it is seen an open door truck trailer latch assembly has been provided of simple rugged heavy construction, easy in operation, wherein the portion of the latch mounted on the rear door and the portion mounted on the trailer side are each shielded from the weather while remaining easily accessible for repair or part replacement.

Such a latch assembly has also been provided operable alternatively from either inside or outside the door and in such manner in either case as to offer virtually no hazard to the operator.

A latch assembly of such character has additionally been provided which is very secure and tenacious in holding due to the action of its parts and its construction, thereby holding heavy truck doors securely in open position despite disturbing forces of the nature of trailer angle, wind or motion.

Finally, a latch assembly has been provided wherein excessive motion of the latching parts relative themselves in engaged relationship is prevented by the action of other parts of the assembly.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A latch for truck trailers of the type having a hinged door adapted to be swung from a closed position to an open position substantially parallel with the wall of the trailer and provided with a latch engaging shaft on the wall of the trailer located near the outer edge of said door when said door is in its open position, comprising a three-sided shield member secured to said door on that side facing the trailer wall when said door is in open position, said shield having a top portion and depending spaced side portions extending downwardly from said top portion, a pair of spaced supports on said door within said shield member, a latch mounting shaft carried by said supports, a pivotal latch mounted on said shaft between said supports having an upper hook portion, another portion of said latch depending below said latch mounting shaft, and a plunger slidably carried in an aperture in said door having an inner portion abutting said depending portion of said latch and an outer portion on the opposite side of said door, said plunger being manually operable from said opposite side to pivot said latch.

2. A latch as in claim 1, including spring means located within said shield member and slidably urging said hook portion away from said door surface.

References Cited in the file of this patent

UNITED STATES PATENTS

| | | |
|---|---|---|
| 482,246 | Hagee | Sept. 6, 1892 |
| 1,128,550 | Thompson | Feb. 16, 1915 |
| 1,936,921 | Strid | Nov. 28, 1933 |